(12) United States Patent
Gole et al.

(10) Patent No.: US 9,710,514 B1
(45) Date of Patent: Jul. 18, 2017

(54) SYSTEMS AND METHODS FOR EFFICIENT STORAGE ACCESS USING METADATA

(71) Applicant: Marvell International Ltd., Hamilton (BM)

(72) Inventors: Abhijeet P. Gole, Cupertino, CA (US); Ram Kishore Johri, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 485 days.

(21) Appl. No.: 14/314,396

(22) Filed: Jun. 25, 2014

Related U.S. Application Data (60) Provisional application No. 61/839,071, filed on Jun. 25, 2013.

(51) Int. Cl.
*G06F 17/30* (2006.01)

(52) U.S. Cl.
CPC .. *G06F 17/30424* (2013.01); *G06F 17/30949* (2013.01); *G06F 17/30091* (2013.01)

(58) Field of Classification Search
CPC ............. G06F 12/0866; G06F 12/0802; G06F 12/0895; G06F 12/0893; G06F 17/30091; G06F 17/3012; G06F 17/30132; G06F 2212/1024; G06F 2212/214; G06F 2212/222; G06F 2212/225; G06F 17/3033; G06F 17/30949
See application file for complete search history.

(56) References Cited

U.S. PATENT DOCUMENTS

| | | | | |
|---|---|---|---|---|
| 6,453,404 | B1* | 9/2002 | Bereznyi | G06F 12/023 711/119 |
| 6,915,307 | B1* | 7/2005 | Mattis | G06F 17/30067 |
| 7,590,652 | B2* | 9/2009 | Passey | G06F 17/30091 |
| 8,027,984 | B2* | 9/2011 | Passey | G06F 17/30091 707/747 |
| 8,688,605 | B2* | 4/2014 | Adair | G06F 17/30345 706/21 |
| 9,053,032 | B2* | 6/2015 | Sengupta | G06F 12/0862 |
| 2006/0156064 | A1* | 7/2006 | Damani | G06F 11/1471 714/16 |
| 2007/0112795 | A1* | 5/2007 | Travison | G06F 17/30327 |
| 2009/0274154 | A1* | 11/2009 | Kopelman | H04L 45/00 370/395.32 |
| 2009/0292721 | A1* | 11/2009 | Laursen | G06F 17/3033 |
| 2010/0031000 | A1* | 2/2010 | Flynn | G06F 17/30949 711/216 |

(Continued)

*Primary Examiner* — Merilyn Nguyen (57) ABSTRACT

Systems and methods are provided for using metadata to efficiently access object data from two or more storage components. Control circuitry receives a request from a host device to perform an operation on a uniquely identified object in a storage system comprising at least a first storage component and a second storage component. Control circuitry retrieves metadata information about the location of the object in store, wherein the metadata information comprises a first indication of a location of the object in the first storage component and a second indication of a location of the object in the second storage component. The objects in one or both of the first and second storage components are located based on the retrieved metadata information, and the requested operation is performed on the requested object.

20 Claims, 5 Drawing Sheets

(56) References Cited

U.S. PATENT DOCUMENTS

2012/0110247 A1* 5/2012 Eleftheriou ......... G06F 12/0888
                                                    711/103
2014/0115244 A1* 4/2014 Maybee .............. G06F 12/0897
                                                    711/105

* cited by examiner

SYSTEMS AND METHODS FOR EFFICIENT STORAGE ACCESS USING METADATA

CROSS REFERENCE TO RELATED APPLICATIONS

This disclosure claims the benefit under 35 U.S.C. §119(e) of U.S. Provisional Application No. 61/839,071, filed Jun. 25, 2013, which is incorporated herein by reference in its entirety.

FIELD OF USE

The present disclosure relates generally to systems and methods for efficient storage access systems. More particularly, the disclosure discusses using metadata to efficiently access object data from two or more storage components.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to storage access technology, and more particularly, to efficiently accessing object information from two or more storage components using metadata information that provides the location(s) of a requested object in one or more of the storage components.

As storage systems increase in capacity and become less expensive to manufacture and purchase, there arises a need to develop more efficient mechanisms for accessing information stored in these large storage systems. For example, cache storage systems are typically relied upon for performing fast-access operations that are frequently used in computer systems. One mechanism for improving the performance of these frequent operations involves the use of metadata structures. These metadata structures may contain information about the location of stored objects and serve as a "directory" for finding these objects across multiple storage components. Metadata may be implemented in different formats and support different operations. The structure and complexity of these metadata formats and supported operations may influence how efficiently objects are retrieved from storage and how well a storage system may adapt to the increasingly complex computing demands among users and enterprise systems.

SUMMARY OF THE DISCLOSURE

Accordingly, methods and apparatuses are provided for efficient storage access using metadata.

In certain embodiments, control circuitry receives a request to perform an operation on a uniquely identified object located in storage, wherein the storage comprises a first storage component and a second storage component. In response to receiving the request, the control circuitry retrieves from the first storage component metadata information about location of the object in storage. The retrieved metadata information comprises a first indication of a location of the object in the first storage component and a second indication of a location of the object in the second storage component. The object in storage is located based on the first indication and the second indication of the retrieved metadata information, and the operation on the located object is performed.

In certain implementations, the retrieved metadata information indicates that the requested object is located in both the first storage component and the second storage component.

In certain implementations, objects stored in the first storage component are accessed more quickly than objects stored in the second storage component.

In certain implementations, the first indication points to a logical memory block corresponding to a physical location of the requested object in the first storage component, and the second indication points to a logical memory block corresponding to a physical location of the requested object in the second storage component.

In certain implementations, the retrieved metadata information is a first entry retrieved from a plurality of entries in a metadata hash table. Each of the plurality of entries is associated with a different uniquely identified object.

In certain implementations, the size of the metadata hash table is proportional to storage capacity of the second storage component.

In certain implementations, each entry in the metadata hash table contains information about a current state of the requested object. The current state is used to determine which operations are permissible to be performed on the requested object.

In certain implementations, each entry in the metadata hash table contains a counter that indicates the number of times the associated object has been requested.

In certain implementations, each entry of the metadata hash table is associated with a respective lock. In response to determining that the requested object is already locked by the lock associated with the first entry, performance of the requested operation on the requested object is delayed until the first entry is no longer locked. An operation on another uniquely identified object associated with a second entry in the metadata hash table is performed. This operation is performed while the first entry is locked and the second entry is not locked.

In certain implementations, the first storage component stores a first reverse lookup hash table. Each entry of the first reverse lookup hash table indicates that a location of the requested object in the first storage component is associated with a respective entry of the metadata hash table. The second storage component stores a second reverse lookup hash table. Each entry of the second reverse lookup hash table indicates that a location of the requested object in the second storage component is associated with the respective entry of the metadata hash table.

In certain embodiments, an apparatus for accessing information from storage comprises control circuitry configured to receive, from a host device, a request to perform an operation on a uniquely identified object located in storage. The storage comprises a first storage component and a second storage component. The control circuitry is also configured to retrieve from a first storage component, in response to receiving the first request, metadata information about location of the object in storage. The retrieved metadata information comprises a first indication of a location of the object in the first storage component and a second indication of a location of the object in the second storage component. The apparatus also comprises storage component circuitry configured to locate the object in storage based on the first indication and the second indication of the retrieved metadata information and perform the operation on the located object.

BRIEF DESCRIPTION OF THE DRAWINGS

The above and other aspects and potential advantages of the present disclosure will be apparent upon consideration of the following detailed description, taken in conjunction with the accompanying drawings, in which like reference characters refer to like parts throughout, and in which.

DETAILED DESCRIPTION

The present disclosure generally relates to using metadata to efficiently access object data from two or more storage components. For illustrative purposes, this disclosure is described in the context of a cache storage system comprising a first storage component comprised of non-volatile random access memory (NVRAM) and a second storage component comprised of one or more solid state drives (SSDs). In an illustrative embodiment, the first storage component is distinguished from the second storage component by virtue of providing faster retrieval of object data than the second storage component. Additionally, for illustrative purposes, first storage component is typically has less storage capacity than second storage component. While this disclosure is described in the context of illustrative embodiments, it should be understood, that this disclosure is also applicable to storage components comprising other types of memory. For example, the first storage component and second storage component may each be comprised of one or more of the following types of memory: RAM, ROM, PROM, EPROM, EEPROM, nvSRAM, FeRAM, MRAM, PRAM, CBRAM, SONOS, RRAM, NRAM, DRAM, SRAM, other types of RAM, hard disk drives, other types of electromechanical magnetic disks, solid state drives, hybrid drives comprising a combination of electromechanical magnetic disks and solid state drives, NAND-based flash memory, Millipede memory, and holographic storage.

Figure 1:
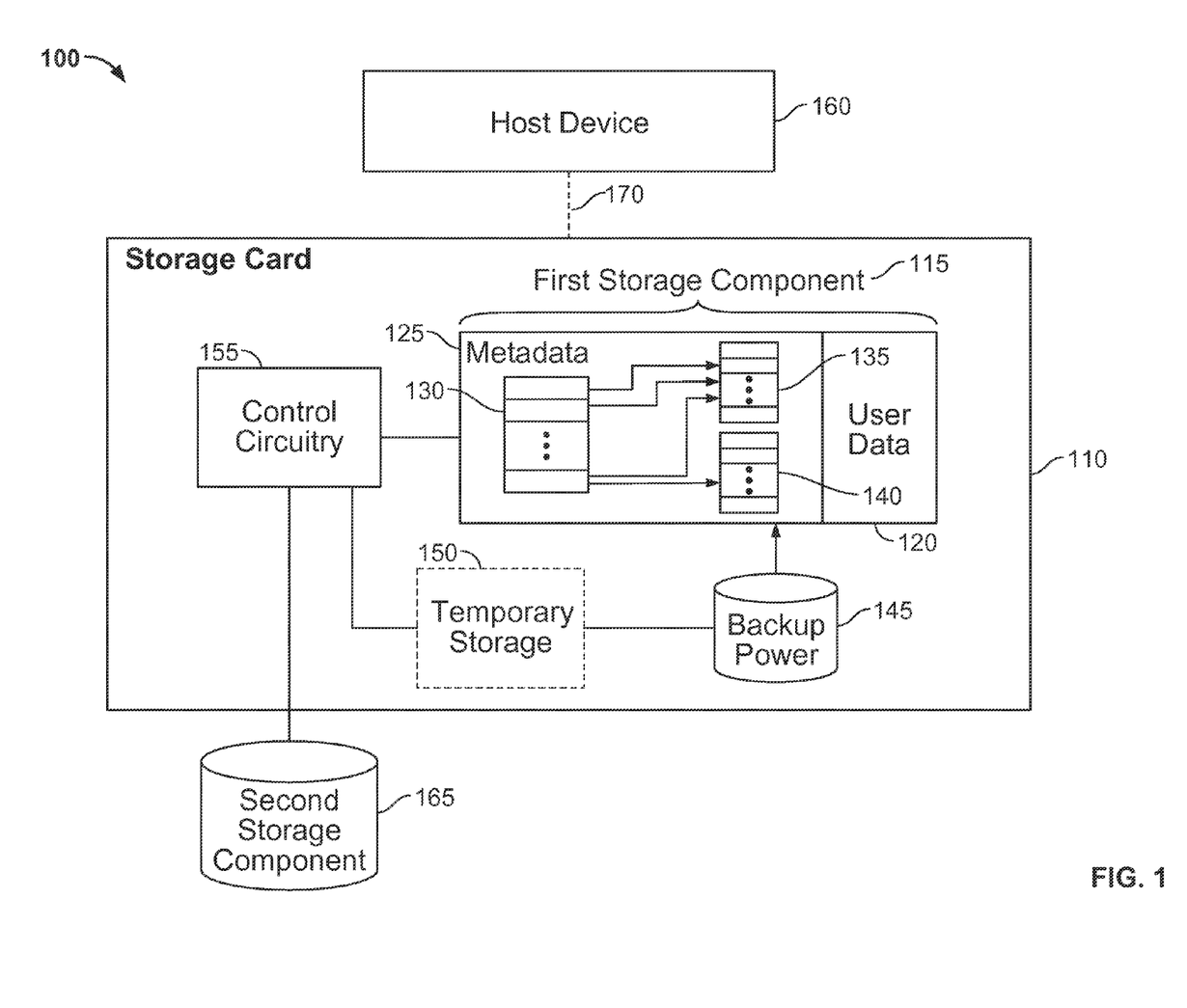
FIG. 1 is a high-level diagram of various components of a storage system that retrieves object data from two storage components through the use of metadata, in accordance with some embodiments of the present disclosure.

FIG. 1 is a high-level diagram of various components of a storage system 100 that retrieves object data from two storage components through the use of metadata, in accordance with some embodiments of the present disclosure. System 100 may include a host device 160, a storage card 110 comprising a first storage component 115, and a second storage component 165.

In some embodiments, host device 100 may be a motherboard on a host computer system. Host device 100 may comprise cache software and a central processing unit (CPU). The cache software on host device 100 may instruct the CPU on host device 100 to send I/O (input/output) requests to read from or write to an object located in the first storage component 115 and/or the second storage component 165.

Host device 100 may communicate with storage card 110 via a communication interface 170. For example, interface 170 may be a PCI interface or a PCIe interface. Storage card 110 may be inserted into host device 160 through interface 170 to allow for communication between host device 160 and storage card 110. For example storage card 110 may be a PCI card or a PCIe card. In particular, storage card 110 may be a cache card. Storage card 110 processes object requests received via communication interface 170 from host device 160. These object requests may be requests to perform a read or write operation on a uniquely identified object. These requests for a particular object may be received and processed by control circuitry 155. For example, control circuitry 155 may be a cache controller.

Control circuitry 155 manages metadata information 125 that keeps track of the location(s) of various object data stored in first storage component 115 and/or second storage component 165. In illustrative embodiments, first storage component 115 is partitioned such that metadata information 130 is located on the same storage component as user data 120. This user data 120 may be data that is required to perform the most frequent operations on host device 160. In other embodiments, metadata information may be stored on another storage component that is separate from user data 120.

In illustrative embodiments, control circuitry 155 retrieves metadata information 130 corresponding to the requested object from first storage component 115. First storage component 115 may be comprised of NVRAM or DRAM or both, in addition to extra capacitors and flash storage used for data recovery purposes. The retrieved metadata information 130 may include information about the location(s) of the requested object on the first storage component 115 and/or second storage component 165. In some embodiments, metadata information may comprise a metadata hash table 130 that provides indications of the locations of object data stored in the first storage component 115 and/or second storage component 165. For example, these indications may be pointers to the logical or physical addresses of the object data located in first storage component 115 and/or second storage component 165.

In some embodiments, metadata hash table 130 includes separate entries for each object stored in first storage component 115 and/or second storage component 165. Each of these object entries in metadata hash table 130 may be associated with an entry in first storage component table 135 and/or an entry in second storage component table 140. First storage component table 135 may contain location information (e.g., logical block address, physical memory address) about the requested object located in first storage component 115. Second storage component table 140 may contain location information (e.g., logical block address, physical memory address) about the requested object located in second storage component 165. Further details about the types of information and the format of information that may be stored in metadata hash table 130, first storage component table 135, and second storage component table 140 are discussed below in relation to FIGS. 3, 4, and 5, respectively.

If the requested object, as requested by host device 160, is stored in first storage component 115, control circuitry 155 communicates with first storage component 115 to perform a requested operation on the object data stored in the user data section 120 of first storage component 115. If the requested object is stored in second storage component 165, control circuitry 155 communicates with second storage component 165. If the requested object is stored in both first storage component 115 and second storage component 165, control circuitry 155 may communicate with both storage components to perform the requested operation on both instances of the requested object, depending on the type of operation requested. For example, some operations may only be applicable to object data stored in the first storage component 110 (e.g., "write-dirty"), whereas other operations may only applicable to object data stored in both the first storage component 115 and the second storage component 165 (e.g., "write-clean", "clean-range"). Further details about the types of operations supported by the storage system described herein are discussed below in relation to FIG. 2.

In some instances, storage system 100 may lose power. For example, host device 160 may be unplugged or experience a power outage. Subsequently, storage card 110 that is inserted into host device 160 may also lose power. In such instances, control circuitry 155 may instruct first storage component 115 to dump all or most of its contents into temporary storage 150 using backup power 145. Backup power 145 may be comprised of a plurality of capacitors that store up charge to keep storage card operational after a power outage. For example, backup power 145 may have enough power to transfer all or most of the content stored first storage component 115 (including metadata 125 and user data 120) to temporary storage 150. Temporary storage may be comprised of any non-volatile memory (e.g., NAND flash storage). Backup power 145 is useful at least because first storage component 115 (e.g., NVRAM) may contain information that is crucial for frequent operations performed by host device 160. Furthermore, since metadata 125 keeps track of location information for objects stored in storage system 100, backup power 145 provides a mechanism for preventing this crucial information from being lost. Once power is restored to host device 160 and storage card 110, control circuitry 155 may instruct temporary storage 150 to dump back the previously transferred contents from first storage component 115 back into first storage component 115 using the restored power source. This backup and data recovery mechanism is especially useful for enterprise storage systems that depend on maintaining massive amounts of crucial information about their customers and business even in the event of crashes and power outages.

Figure 2:
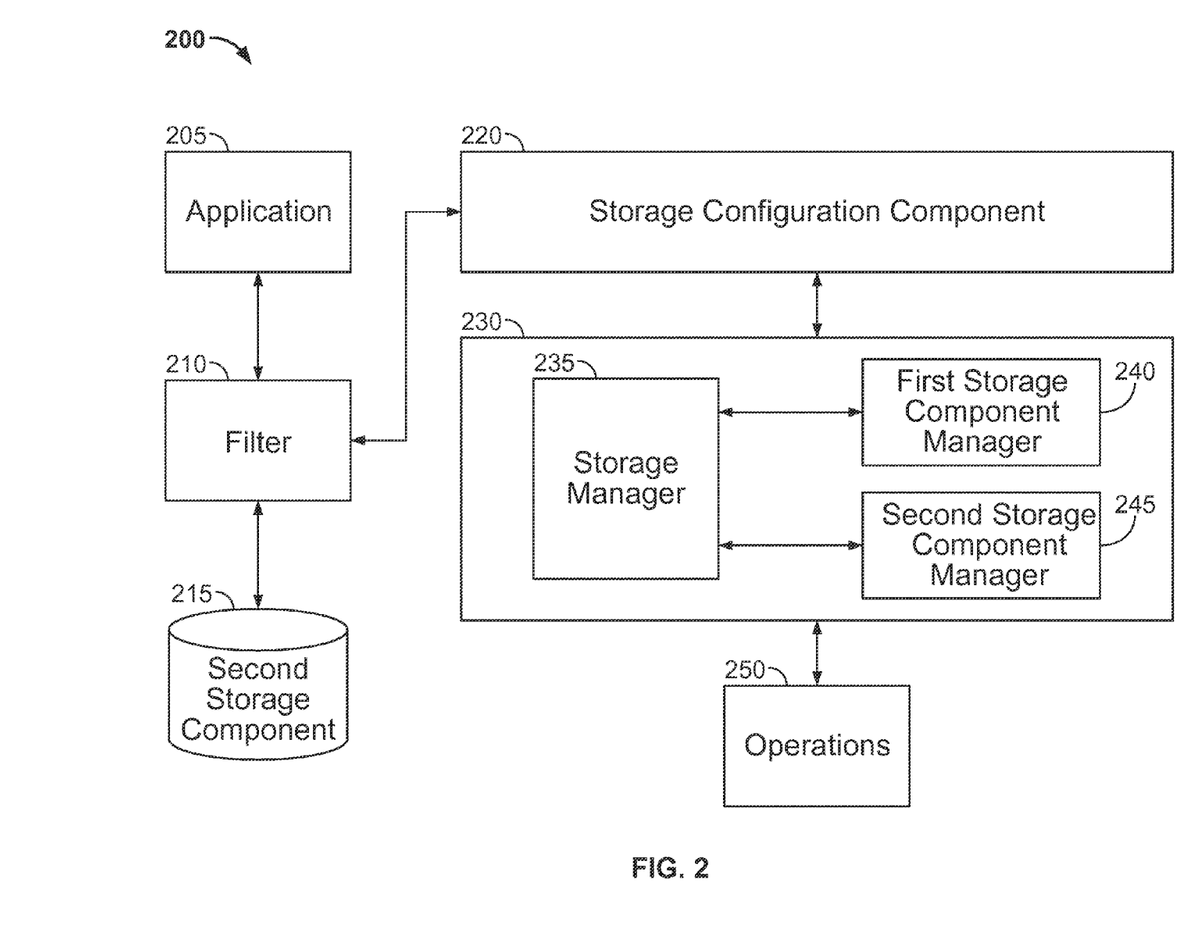
FIG. 2 illustrates the interactions between various components of a storage system, in accordance with some embodiments of the present disclosure.

FIG. 2 illustrates the interactions between various components of a storage system, such as storage system 100, in accordance with some embodiments of the present disclosure. In some embodiments, application component 205, filter component 210, storage configuration component 220, and second storage component 215 (e.g., SSDs, which is also illustrated as 165 in FIG. 1) may be controlled by host device 160 (see FIG. 1). Storage management component 230 may reside on storage card (e.g., cache card). Storage management component 230 may be controlled by control circuitry 155 (e.g., cache controller) to manage first storage component 115 and second storage component 165 of storage system 100. Storage management component 230 may support a variety of operations 250 for managing storage of storage system 100. For example, control circuitry 155, which controls storage management component 230, may perform or instruct the performance of various operations. These operations include, but are not limited to, metadata operations for reading from and writing to objects stored in storage system 100, DMA operations for moving data between host device 160 and storage card 110, and atomic operations which allow both the aforementioned metadata operations and DMA operations to be executed concurrently as multiple parallel processes.

Application 205 may be any software application, medium-ware application, or combination of both that is implemented on host device 160. When the CPU of host device 160 runs application 205, various high level operations need to be performed. For example, if application 205 is a word processing application, some of the frequent high-level operations may include, but are not limited to, opening a file, writing to a file, and saving a file. In some embodiments, the CPU of host device 160 may send these high-level operations through filter component 210 in order to translate the high-level operations into lower-level operations able to be interpreted by storage management component 230. For example, the high level operation of "opening a file" on application 205 may be filtered by filter 210 into a lower-level operation of "read object x", wherein x is a unique identifier for the file. In another example, the high-level operation of "saving a file" may be filtered by filter 210 into a lower-level operation of "write object x". The CPU of host device 160 then sends storage management component 230 requests to perform these filtered lower-level operations. In some embodiments, high-level operations are filtered within application 205 and not a separate filter component 210 residing on host device 160.

In some embodiments, host device 160 may send the filtered lower-level operations to storage configuration component 220 before sending them to storage management component 230 on storage card 110. Storage configuration component may contain various policies (e.g., cache policies) that are applicable to storage-related operations sent by host device 160. For example, the storage policies may map certain filtered operations to certain objects or set of objects stored in storage system 100. For example, one of the storage policies may specify which objects to cache in the first storage component 115 (e.g., NVRAM) and which objects to store in the second storage component 215 (e.g., SSDs). For example, objects related to frequently performed operations by host device 160 (e.g., objects for maintenance and upkeep of a computer system such as booting and shutting down the system) may be stored in the first storage component 115 (e.g., cache), and objects related to operations that are less frequently performed by host device 160 (e.g., files that correspond to special applications that are not often used) may be stored in the second storage component. In some embodiments, storage configuration component may apply these storage policies to requests sent from application 205 by performing an additional filtering step on operations already filtered by filter 210.

In some embodiments, storage configuration component 220 applies relevant storage policies to operations from application 205 and then sends these policy-filtered operations to storage management component 230. In other embodiments, host device 160 bypasses storage configuration component 220 and sends operation requests from application 205 directly to storage management component 230. These directly sent operations may or may not have been filtered by filter component 210. Storage management component 230 may comprises several subcomponents, including storage manager 235, first storage component manager 240, and second storage component manager 245. These three components are responsible for supporting different operations 250 on objects, depending on the type of operation and the location of the requested object.

Storage manager 235 is mainly responsible for managing the overall storage system 100. Control circuitry 155 on storage card 1150 may execute operations performed by storage manager 235. This includes, but is not limited to, managing information retrieval of metadata information (e.g., operations on metadata 125 such as reading from and writing to metadata hash table 130) and relaying instructions to and from each of first storage component 115 and second storage component 165 and between both storage components (e.g., DMA operations). For example, storage manager 235 may determine from metadata information retrieved from metadata partition 125 that a requested object resides in both first storage component 115 and second storage component 165. In such instances, storage manager 235 may instruct both first storage component manager 240 and second storage component manager 245 to perform a requested operation (e.g., read, write) on the requested object. In another example, storage manager 235 may determine from the retrieved metadata that a requested object resides only on second storage component 215. In such instances, storage manager 235 may instruct second storage component manager 245 to transfer the requested object data to first storage component 115, which is closer in proximity to control circuitry 155 (which is responsible for executing operations of storage manager 235) than second storage component 165 (or 215).

Figures 3, 4, 5:
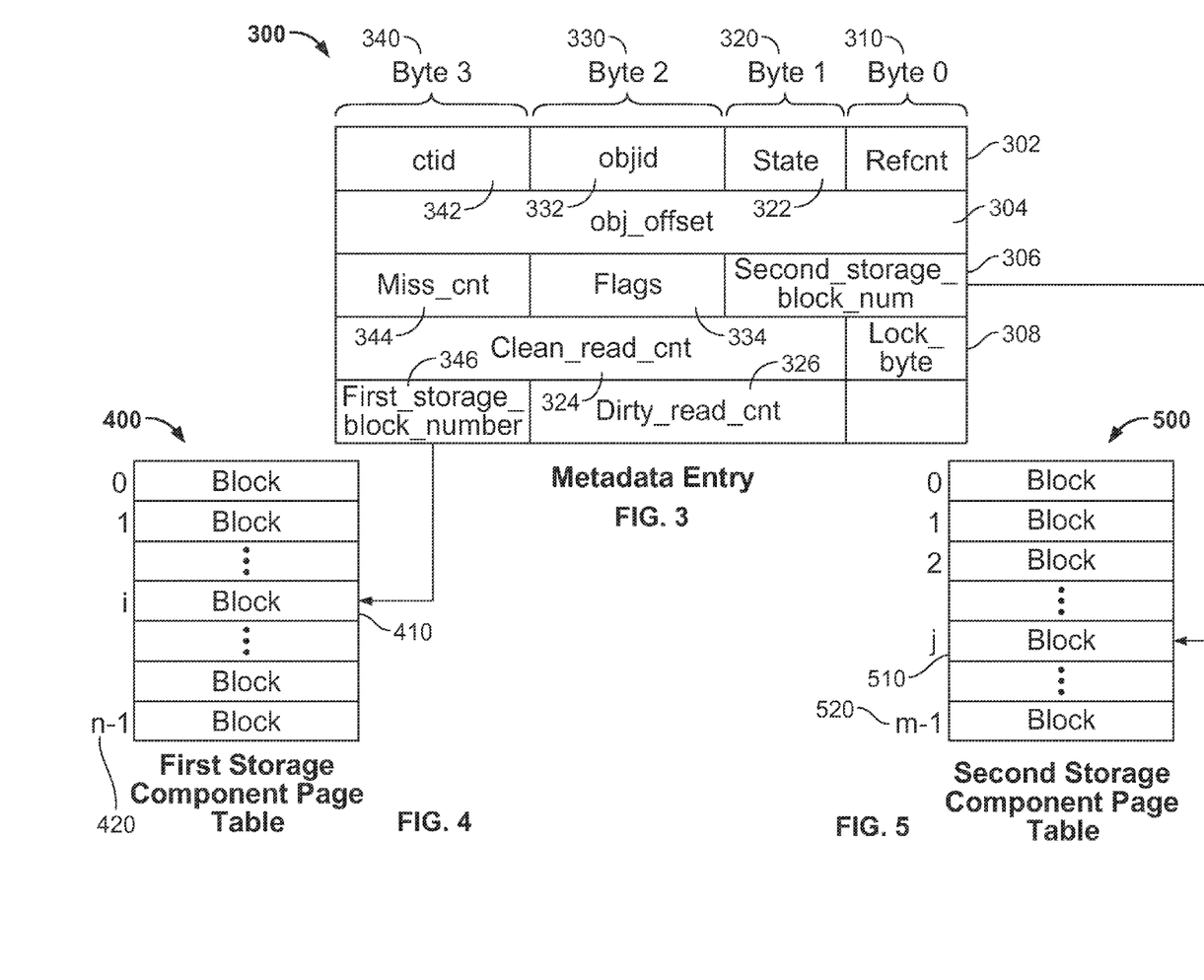
FIG. 3 illustrates a format for a metadata entry used to locate object data in a storage system, in accordance with some embodiments of the present disclosure.
FIG. 4 illustrates a page table for locating object data stored in a first storage component of a storage system, in accordance with some embodiments of the present disclosure.
FIG. 5 illustrates a page table for locating object data stored in a second storage component of a storage system, in accordance with some embodiments of the present disclosure.

In contrast to storage manager 235, first storage component manager 240 is mainly responsible for managing object data that resides on the first storage component 115 (e.g., reading from and writing to user data stored in cache, fetching a physical memory address of an object stored in the cache based on a logical block address retrieved from a first storage component page table 400). Similarly, second storage component manager 245 is mainly responsible for managing object data that resides in the second storage component 215 (or 165) (e.g., reading from and writing to user data stored in the SSDs or hard drive, fetching a physical memory address of a object stored in the second storage component based on a logical block address retrieved from a second storage component page table 500). Operations performed by first storage component manager 240 may be executed by control circuitry 155 or other control circuitry (not shown in the Figures) that is separate from control circuitry 155. Similarly, operations performed by second storage component manager 245 may be executed by control circuitry 155 or other control circuitry (not shown in the Figures).

FIG. 3 illustrates a format for a metadata entry used to locate object data in a storage system, in accordance with some embodiments of the present disclosure. For illustrative purposes, metadata entry 300 may be an entry in metadata hash table 130 residing on first storage component 115. However, it should be understood that metadata entry 300 may be an "entry" in other types of data structures that are not hash tables. Metadata entry 300 may be a contiguous or non-contiguous block of memory. Metadata entry 300 comprises various fields of data which provide information about the location (e.g., physical, logical, or both) about a requested object stored in first storage component 115 and/or second storage component 165. The size of each of these fields may be a multiple of an integer number of bytes. For example, metadata entry (300) may be indexed at every 4k bytes, wherein byte0 (310) corresponds to the first 4k bytes, byte1 (320) corresponds to the second 4k bytes, byte2 (330) corresponds to the third 4k bytes, and byte3 (340) corresponds to the fourth 4k bytes. For illustrative purposes, the fields of metadata entry 300 are organized in a certain order and size, as shown in FIG. 3. However, it should be understood that the fields of metadata entry 300 may be organized in any other order and occupy any other size of memory. It should also be understood that the number and variety of fields shown in illustrative metadata hash table entry 300 are not limiting examples, and metadata entry may comprises any other number or type of fields that provide location information to objects stored in the storage system 100.

Each metadata entry 300 in metadata hash table 130 corresponds to a uniquely identified object in first storage component 115 and/or second storage component 165. The unique identifier of the object may be stored in field 332 ("objid"). This object id may be an integer that is used as a parameter to hash function (e.g., h1(x)) to determine the entry index of metadata entry 300 in metadata hash table 130. For example, if object id is "a", the metadata entry for object "a" is stored at index h1(a) in metadata hash table 130.

In addition to the object id 332, metadata entry 300 may also store pointers 345 and 206 to first storage component page table 400 and second storage component page table 500, respectively. In particular, field 346 ("first_storage_block_num") may contain the logical block address (LBA) corresponding to an object with unique identifier "a". For example, the physical location of object "a" may be stored at the ith block 410 in first storage component page table 400. Block 410 may be stored at the LBA specified by field 346. In another example, object "a" may also be stored in second storage component 165. In such cases, field 306 of metadata entry 300 may contain the LBA of object "a" in second storage component page table 500. For example, the physical location object "a" may be stored at the jth block 510 in second storage component page table 500. Block 510 may be stored at the LBA specified by field 306. Further details about first storage component page table 400 and second storage component page table 500 are discussed below in relation to FIGS. 4 and 5, respectively.

In some embodiments, the physical location of an object may be provided at certain block indices in memory (physical storage component 115 or 165). For example, if object data typically occupies a certain "block-size" (e.g., 16k bytes), the physical address may only begin at integer multiples of the block-size (e.g., every 16k bytes in physical memory). However, an object may not be located at the beginning of a specified block. In such cases, metadata entry 300 may contain a field 204 ("obj_offset") that provides the object offset of objects located in a particular block in physical memory. For example, if obj_offset is 4k bytes, and the physical location of the object is at block address b in physical memory, the object will be located starting at b+4k bytes in physical memory. In some embodiments, the same or similar offset scheme is used for locating the LBA of an object in a page table (e.g., 400, 500). Different granularities of offset sizes (e.g., 4k, 8k, 16k) are useful for different types of applications. The granularity of the offset size may map to the application block size, which may have a direct effect on the performance of the application 205. For example, offsets corresponding to large block sizes may be more suitable for sequential workloads (read or write), whereas offsets corresponding to small block sizes may be suitable for metadata intensive workloads.

Storage management component 230 may use other fields in metadata entry 300 to determine which objects to store in which storage components (115 or 165) to increase the performance of the storage system 100 based on storage policies may be provided by storage configuration component 220. For example, field 342 ("ctid") keeps a count of the number of times a particular object with object id 332 is requested by host device 160. Another field 344 ("miss-cnt") keeps track of how many times an object with object id 332 was not stored in first storage component 115 (e.g., cache) at the time of the object request (i.e., the number of times a requested object was "missed"). Field 324 ("clean_read_cnt") keeps track of the number of times a clean object was read. Field 326 ("dirty_read_cnt") keeps track of the number of times a dirty object was read. A "clean" object is an object that is located in both first storage component 115 (e.g., cache) and second storage component (e.g., SSDs). In contrast a "dirty" object is an object that is only located in first storage component 115. It is "dirty" because any changes applied to the object in the first storage component need to be "cleaned" (i.e., propagated to a copy stored in second storage component 165). This way, in the event of a power outage, write-operations (which change an object) will not have to be re-performed, as the changes have been applied and stored in non-volatile second storage component 165. Together, count fields (e.g., 342, 302, 344 324, 325) allow storage manager 235, informed by the policies stored by storage configuration component 220, to decide which objects to keep or transfer to first storage component 115 only (e.g., high "ctid" 342 value, high "miss-cnt" 344 value) which objects to keep in second storage component 165 only (e.g., objects with low "ctid" 342 values), and which objects to store in both first storage component 115 and second storage component 165 (e.g., high "clean_read_cnt" 324 and high "dirty_read_cnt" 326 values).

The state field 322 may be used to determine what types of operations may be permissible to be performed on a requested object. For example, state field 322 may indicate that the object with id 332 is currently being written to (e.g., state=writing). In this case, storage configuration component 220 may implement a policy that dictates that operations involving writing to an object may not be performed while the object is currently being written to. Additionally, another policy may dictate that operations involving reading from an object may not be performed on an object that is currently written to.

Relatedly, the lock_byte field 308 keeps track of whether a particular object is locked so that certain operations may not be performed while other operations are being performed on an object. In some embodiments, locks may be provided for each entry in the metadata hash table 130 or for each object in the entry. In instances where metadata information for multiple objects are stored in the same entry in metadata hash table 130, locking one object in the entry will not affect whether operations may be performed on another object in the same entry.

There may be locks for different types of operations. For example, a process A may obtain a write lock when the state 322 is "free" (i.e., no other process reading or writing to the object). When the write lock is obtained, lock-byte indicates that the write lock has been obtain, thereby preventing any other write operations from being performed on the locked object by other processes. In some instances, while process A has the write lock, another process B may request to perform an operation on the requested object. However, since the object is locked by process A, process B will have to wait until the write lock is released by process A to perform the operation on the object. In illustrative embodiments, metadata hash table 130 supports fine grain locking mechanisms such that locking a first entry for a first object in a metadata hash table does not lock the entire metadata hash table. Subsequently, even though a first entry for a first object may be locked by process A, a second object whose state is "free" may be operated on by another process at the same time process A is writing to the first object. When the process with the write-lock is done writing to the first object, that process releases the write-lock, and the lock-byte indicates that processes may perform write operations on the object. Metadata entries supporting the use of locks help support concurrent operations that are increasingly performed in the multi-processor computing age.

Metadata entry 300 may also contain fields that relate to a range of the object. For example, "flags" field 334 represents the state associated with the range of the object. The "refcnt" field 302 indicates the number of pending operations on the range of the object.

FIG. 4 illustrates a page table for locating object data stored in a first storage component of a storage system, such as storage system 100, in accordance with some embodiments of the present disclosure. As discussed above in relation to "first_storage_block_num" field 346, first storage component page table 400 may provide the location of a requested object stored in the first storage component 115. Page table 400 may comprise n blocks. In some embodiments, each block contains the physical memory address of one or more requested objects stored in the first storage component 115. In some embodiments, each block contains another logical memory address (pointing to another page table stored on first storage component 110, not shown) of one or more objects stored in first storage component 115. In illustrative embodiments, page table 400 is a hash table stored in the first storage component 115 along with metadata hash table 130 (as illustrated by page table 135 in FIG. 1) to increase the retrieval time of objects located in a first storage component 115 (e.g., cache). For example, page table 400 may implement a hash function h2(x), wherein x is the LBA value specified by field 346 in metadata entry 300 of an object with id value 330="a".

FIG. 5 illustrates a page table for locating object data stored in a second storage component of a storage system, in accordance with some embodiments of the present disclosure. As discussed above in relation to "second_storage_block_num" field 306, second storage component page table 500 may provide the location of a requested object stored in the second storage component 165. Page table 500 may comprise m blocks. Since second storage component 165 is typically larger in capacity than first storage component 115, m is typically a larger integer value than n. In some embodiments, each block contains the physical memory address of one or more requested objects stored in the first storage component 115. In some embodiments, each block contains another logical memory address (pointing to another page table stored on first storage component 110, not shown) of one or more objects stored in first storage component 115. In illustrative embodiments, page table 400 is a hash table stored in the first storage component 115 along with metadata hash table 130 (as illustrated by page table 135 in FIG. 1) so that control circuitry 155 can quickly determine whether a object needs to be retrieved from second storage component 165. For example, page table 400 may implement a hash function h3(x), wherein x is the LBA value specified by field 306 in metadata entry 300 of an object with id value 330="a".

In general, first storage component page table 400 and second storage component page table 500 are analogous structures which support the same or similar types of features for fetching location information about objects stored in their respective storage components. It is advantage for metadata entry 300 to store two fields 306 and 346 which directly point to first storage component page table 400 and second storage component page table 500, respectively, so that control circuitry 155 implementing storage manager 235 can quickly determine whether a requested object needs to be transferred from second storage component 165 to first storage component 115. This way, control circuitry 155 does not need to perform an additional step of first checking first storage component 115 for whether the object is stored in the cache before determining whether to retrieve the object from second storage component 165 (which typically takes longer than retrieving an object from first storage component 115).

Figure 6:
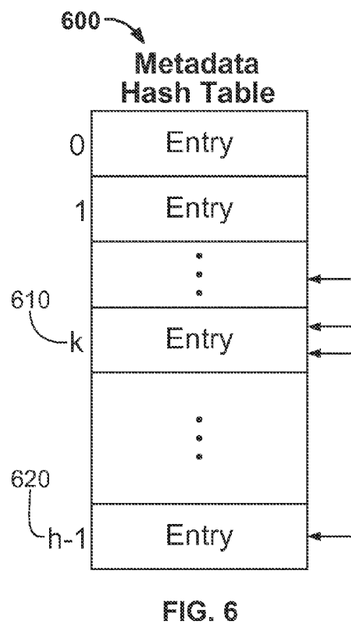
FIG. 6 illustrates a metadata hash table comprising entries for each object located in a storage system, in accordance with some embodiments of the present disclosure.

FIG. 6 illustrates a metadata hash table 600 comprising entries for each object located in a storage system, such as storage system 100, in accordance with some embodiments of the present disclosure. Each entry in metadata hash table 600 corresponds to an illustrate metadata entry 300, as discussed above in relation to FIG. 3. In illustrative embodiments, metadata hash table 600 is stored in the first storage component 115 along with user data 120, first storage component table 135 (discussed above in relation to FIG. 4), and second storage component page table 120 (discussed above in relation to FIG. 5) in order to facilitate and improve lookup and retrieval time of objects stored in storage system 100. As shown in illustrative hash table 600, metadata hash table 600 may be comprised of h separate entries, which indicate the size of the hash table 600. The size of metadata hash table 600 may scale with the capacity of first storage component 115 and/or second storage component 165, while still providing constant lookup time for requested objects in the metadata hash table 600. For example, the size of the metadata hash table 600 may be proportional to the storage capacity of the first storage component 115, the second storage component 165, or both the storage components 115 and 165.

As discussed above in relation to metadata entry 300, metadata hash table 600 may implement a hash function h1(x), wherein x is the unique object identifier of a requested object. For example, if the object id is "a", then metadata entry for object "a" will be stored in entry h1(x) of metadata hash table 600. Metadata hash table 600 may store metadata information (each with the format illustrated in entry 300 in FIG. 3) for multiple objects. For example, metadata information for object with id "b" may be stored in entry h1(b) of metadata hash table 600, wherein h1(a)=h1(b). This implies that metadata information for object "a" is stored in the same entry as metadata information for object "b"). Metadata hash table 600 uses hash function h1(x) to allow metadata information for many objects to be retrieved with constant lookup time regardless of the size of the storage components 115 and 165.

Figure 7:
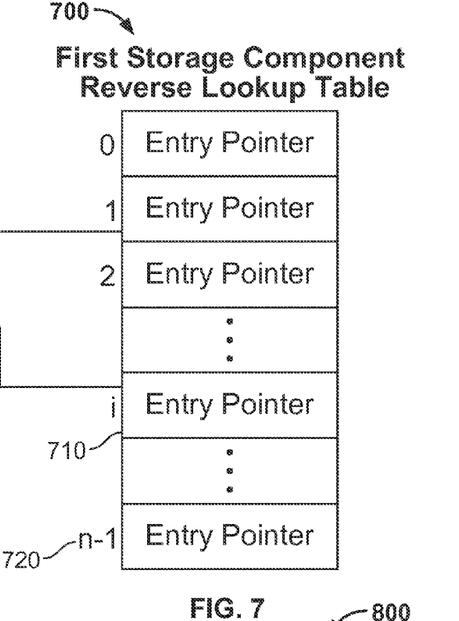
FIG. 7 illustrates a reverse look-up table that associates objects in a first storage component with a corresponding metadata entry in a metadata hash table, in accordance with some embodiments of the present disclosure.

FIG. 7 illustrates a reverse look-up table that associates objects in a first storage component 115 with a corresponding metadata entry in a metadata hash table, in accordance with some embodiments of the present disclosure. First storage component reverse look-up table 700 may be stored on first storage component 115. Reverse look-up table 700 comprises n−1 entries, the same number of blocks in page table 400. Each entry in reverse look-up table 700 corresponds to a block in page table 400. For example, the ith entry pointer 710 in reverse look-up table corresponds to the ith block 410 in page table 400. Each entry in reverse look-up table points to a particular metadata entry in metadata hash table 600. For example, as shown in FIG. 7 and FIG. 6, the ith entry pointer 710 may point to the kth metadata entry 610 in metadata hash table 600. Reverse look-up table 700 allows objects in the first storage component 115 to be rearranged and their location information updated in the metadata entries without having to modify the arrangement of their corresponding metadata entries in metadata hash table 600.

For example, the physical location of an object with id="a" may be stored in the ith block 410. The metadata information for object "a" may be stored in the kth entry 610 in metadata hash table 600. In some instances, control circuitry 155 of storage manager 235 may rearrange the objects in first storage component 115 to enhance the performance of certain frequently requested operations by host device 160. Storage manager 235 may decide to instruct this rearrangement according to the policies dictated by storage configuration component 220. This rearrangement may cause object "a", which used to be located in the physical location specified by the ith block 410 (in page table 400) to be moved to another physical location specified by (n−1)th block 420 in page table 400. In such instances, first component storage circuitry (not shown), which implements first storage component manager 240, may update the entry pointers in reverse lookup table 700 to reflect this rearrangement. In particular, first storage component circuitry may update the reverse look-up table 700 such that the ith entry pointer 710, which previously corresponded to object a, no longer points to the kth entry 610 in metadata hash table. Instead, first storage component circuitry may update the (n−1)th entry pointer 720 (corresponding to the (n−1)th block in page table 400) to point to the kth entry 610 to reflect that object "a" is stored at the physical location specified by the (n−1)th block in page table 400. This process for updating pointers using the reverse look-up table 700 allows metadata hash table 600 to keep the metadata information for objects in the same index entries even when the physical location of the object changes in storage. Thus, reverse lookup tables and metadata hash tables are used together to provide flexibility for rearranging objects in memory to improve the performance of operation while still maintaining constant lookup time for metadata information about objects stored in storage system 100.

Figure 8:
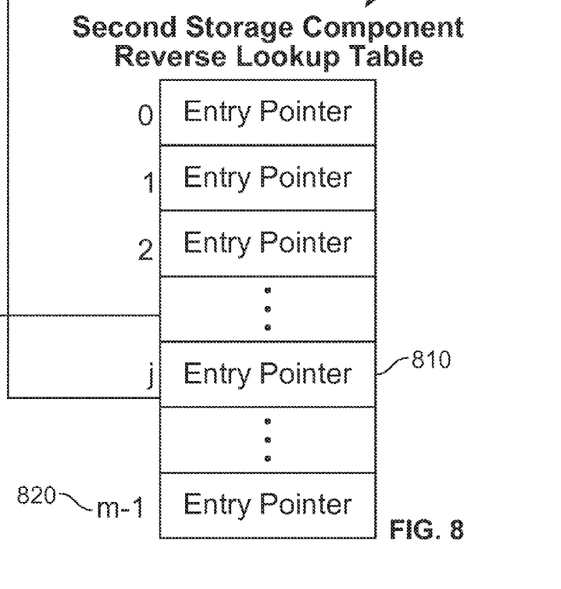
FIG. 8 illustrates a reverse look-up table that associates objects stored in a second storage component with a corresponding metadata entry in a metadata hash table, in accordance with some embodiments of the present disclosure.

FIG. 8 illustrates a reverse look-up table that associates objects stored in a second storage component 165 with a corresponding metadata entry in a metadata hash table, in accordance with some embodiments of the present disclosure. Second storage component reverse look-up table 800 may be stored on second storage component 165. Reverse look-up table 800 comprises m−1 entries, the same number of blocks in page table 500. Each entry in reverse look-up table 800 corresponds to a block in page table 500. For example, the jth entry pointer 810 in reverse look-up table 800 corresponds to the jth block 510 in page table 500. Each entry in reverse look-up table points to a particular metadata entry in metadata hash table 600. For example, as shown in FIG. 8 and FIG. 6, the jth entry pointer 810 may point to the kth metadata entry 610 in metadata hash table 600. Reverse look-up table 800 allows objects stored in the second storage component to be rearranged and their location information updated in the metadata entries without having to modify the arrangement of their corresponding metadata entries in metadata hash table 600.

For example, the physical location of an object with id="a" may be stored in the jth block 510. The metadata information for object "a" may be stored in the kth entry 610 in metadata hash table 600. In some instances, control circuitry 155 of storage manager 235 may rearrange the objects in second storage component 165 to enhance the performance of certain operations relevant to storage access of the second storage component 165. Storage manager 235 may decide to instruct this rearrangement according to the policies dictated by storage configuration component 220. This rearrangement may cause object "a", which used to be located in the physical location specified by the jth block 510 (in page table 500) to be moved to another physical location specified by (m−1)th block 820 in page table 800. In such instances, second component storage circuitry (not shown), which implements second storage component manager 245, may update the entry pointers in reverse lookup table 800 to reflect this rearrangement. In particular, second storage component circuitry may update the reverse look-up table 800 such that the jth entry pointer 810, which previously corresponded to object a, no longer points to the kth entry 610 in metadata hash table. Instead, second storage component circuitry may update the (m−1)th entry pointer 820 (corresponding to the (m−1)th block 520 in page table 500) to point to the kth entry 610 to reflect that object "a" is stored at the physical location specified by the (m−1)th block in page table 500.

As shown above, the use of separate reverse lookup tables 700 and 800 for first storage component 115 and second storage component 165 allows objects stored in both storage components to be moved independently of each other, while making no changes to the metadata information stored about the particular moved objects in metadata hash table 600.

Figure 9:
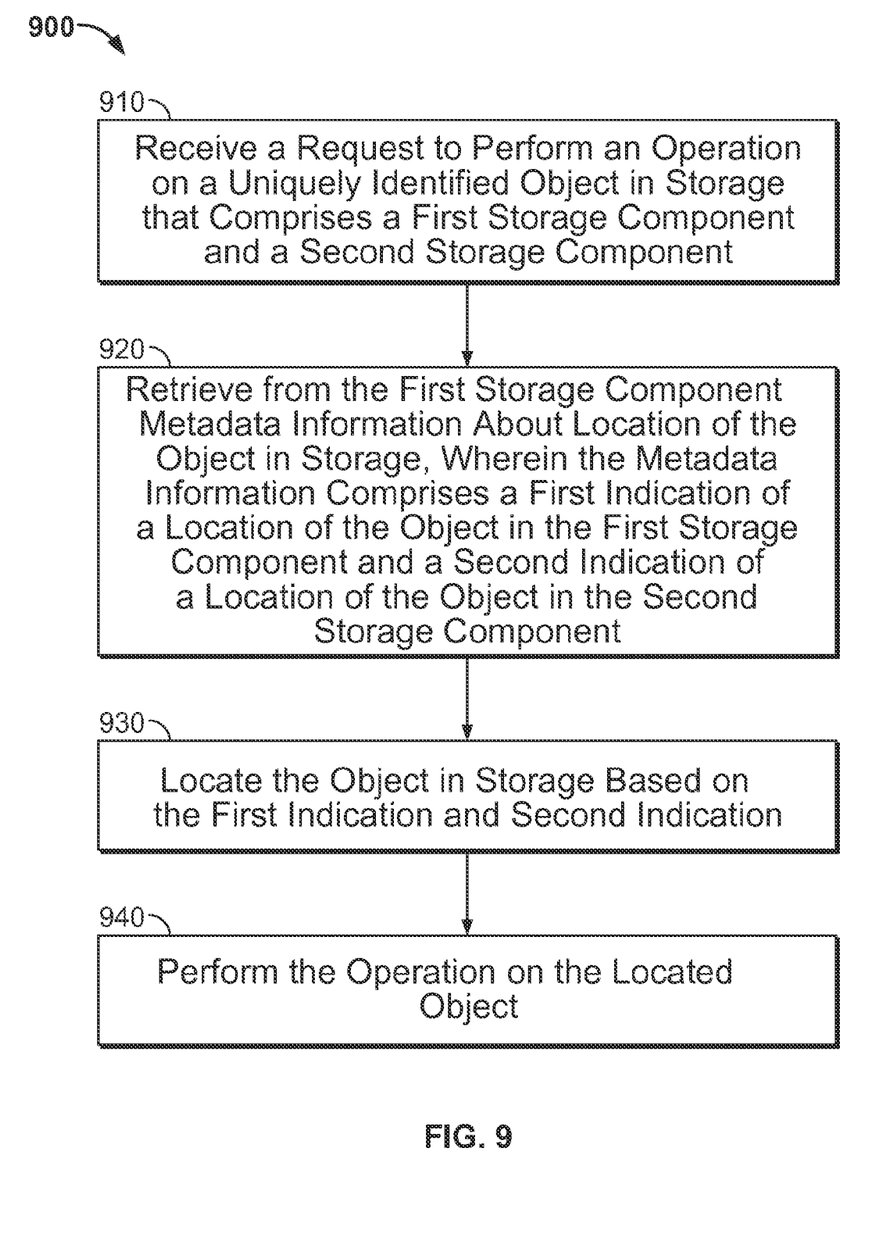
FIG. 9 is a high-level flow diagram of a method for accessing object data from two or more storage components using metadata, in accordance with some embodiments of the present disclosure.

FIG. 9 is a high-level flow diagram of a method for accessing object data from two storage components using metadata, in accordance with some embodiments of the present disclosure. At 910, control circuitry 155 of storage card 110 receives a request to perform an operation on a uniquely identified object in storage in storage system 100 that comprises a first storage component 115 and a second storage component 165. For example, control circuitry 155 may be a cache controller that receives a request to perform a read or write operation from host device 160 on an object with a unique identifier (e.g., as indicated by field 332 in metadata entry 300) stored in first storage component 115 only, second storage component 165 only, or both storage components 115 and 165.

At 920, control circuitry 155 retrieves from the first storage component 115 metadata information about location of the object in storage, wherein the metadata information comprises a first indication of a location of the object in the first storage component 115 and a second indication of a location of the object in the second storage component 165. For example, control circuitry 155 may retrieve the metadata information from metadata partition 155 stored in first storage component 115. In particular, control circuitry 155 may retrieve metadata information from a particular entry (as discussed in relation to metadata entry 300) from metadata hash table 130. The retrieved metadata information may indicate that the requested object is stored both in first storage component 115 and second storage component 165. For example, the first indication of the location of the object in the first storage component 115 may be a pointer to a block in first storage component page table 400, as discussed in relation to field 346 in metadata entry 300. For example, the second indication of the location of the object in the second storage component 165 may be a pointer to a block in second storage component page table 500, as discussed in relation to field 206 in metadata entry 300.

At 930, control circuitry 155 may instruct storage component circuitry (e.g., either first storage component circuitry or second storage component circuitry or both) to locate the object in storage system 100 based on the first indication and second indication. For example, first storage component circuitry may perform operations for first storage manager component 240. First storage component circuitry may reside on first storage component 115 and use the retrieved first indication (e.g., LBA of the object in first storage component page table 400) to determine the physical location of the object in first storage component 115, as discussed above in relation to FIGS. 3 and 4. In another example, if the first indication indicated that the object is not stored in first storage component 115, first storage component circuitry does not locate the object in first storage component 110. Similarly, second storage component circuitry may reside on second storage component 165 and use the retrieved second indication (e.g., LBA of the object in second storage component page table 500) to determine the physical location of the object in second storage component 165, as discussed above in relation to FIGS. 3 and 5. Alternatively, if the second indication indicated that the object is not stored in the second storage component 165, second storage component circuitry does not locate the object in second storage component 165.

At 940, storage component circuitry (e.g., either first storage component circuitry or second storage component circuitry or both) performs the operation on the located object. For example, these operations may be any of the operations discussed above in relation to operations 250 and may be performed sequentially or concurrently with other operations on the requested object.

The foregoing describes methods and an apparatus for storing information in a programmable storage device. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software.

What is claimed is:

1. A method for accessing information from storage, the method comprising:
    receiving, using control circuitry, a request to perform an operation on a uniquely identified object located in storage, wherein the storage comprises a first storage component and a second storage component, wherein the first storage component stores a reverse lookup hash table, wherein each entry of the reverse lookup hash table identifies which entry in a metadata hash table identifies a storage location of each object in the first storage component;

in response to receiving the request, retrieving, using the control circuitry, from the metadata hash table stored in the first storage component metadata information about one or more locations of the object in storage, wherein the retrieved metadata information comprises a first indication of the location of the object in the first storage component and a second indication of a location of the object in the second storage component;

locating the object in storage based on the first indication and the second indication of the retrieved metadata information; and performing the operation on the located object.

2. The method of claim 1, wherein the retrieved metadata information indicates that the object is located in both the first storage component and the second storage component.

3. The method of claim 1, wherein objects stored in the first storage component are accessed more quickly than objects stored in the second storage component.

4. The method of claim 1, wherein:
the first indication points to a logical memory block corresponding to a physical location of the object in the first storage component, and
the second indication points to a logical memory block corresponding to a physical location of the object in the second storage component.

5. The method of claim 1, wherein the retrieved metadata information is a first entry retrieved from a plurality of entries in the metadata hash table, wherein each of the plurality of entries is associated with a different uniquely identified object.

6. The method of claim 5, wherein the first entry in the metadata hash table maps the object to the first indication of the location of the object in the first storage component; and
a first entry in the reverse lookup hash table maps the first indication of the location of the object in the first storage component to the first entry in the metadata hash table.

7. The method of claim 5, wherein each entry in the metadata hash table contains information about a current state of the object, wherein the current state is used to determine which operations are permissible to be performed on the object.

8. The method of claim 5, wherein each entry in the metadata hash table contains a counter that indicates a number of times an operation associated with the object has been requested.

9. The method of claim 5, wherein each entry of the metadata hash table is associated with a respective lock, further comprising:
in response to determining that the object is already locked by the lock associated with the first entry, delaying performance of the requested operation on the object until the first entry is no longer locked; and
performing an operation on another uniquely identified object associated with a second entry in the metadata hash table, wherein the operation is performed while the first entry is locked and the second entry is not locked.

10. The method of claim 5, wherein:
the second storage component stores a second reverse lookup hash table, wherein each entry of the second reverse lookup hash table indicates that the location of the object in the second storage component is associated with the respective entry of the metadata hash table.

11. An apparatus for accessing information from storage, the apparatus comprising:
control circuitry configured to:
receive, from a host device, a request to perform an operation on a uniquely identified object located in storage, wherein the storage comprises a first storage component and a second storage component, wherein the first storage component stores a reverse lookup hash table, wherein each entry of the reverse lookup hash table identifies which entry in a metadata hash table identifies a storage location of each object in the first storage component;
in response to receiving the request, retrieve from the metadata hash table stored in the first storage component metadata information about one or more locations of the object in storage, wherein the retrieved metadata information comprises a first indication of a location of the object in the first storage component and a second indication of a location of the object in the second storage component; and
storage component circuitry configured to:
locate the object in storage based on the first indication and the second indication of the retrieved metadata information; and
perform the operation on the located object.

12. The apparatus of claim 11, wherein the retrieved metadata information indicates that the object is located in both the first storage component and the second storage component.

13. The apparatus of claim 11, wherein objects stored in the first storage component are accessed more quickly than objects stored in the second storage component.

14. The apparatus of claim 11, wherein:
the first indication points to a logical memory block corresponding to a physical location of the object in the first storage component, and
the second indication points to a logical memory block corresponding to a physical location of the object in the second storage component.

15. The apparatus of claim 11, wherein the retrieved metadata information is a first entry retrieved from a plurality of entries in the metadata hash table, wherein each of the plurality of entries is associated with a different uniquely identified object.

16. The apparatus of claim 15, wherein the first entry in the metadata hash table maps the object to the first indication of the location of the object in the first storage component; and
a first entry in the reverse lookup hash table maps the first indication of the location of the object in the first storage component to the first entry in the metadata hash table.

17. The apparatus of claim 15, wherein each entry in the metadata hash table contains information about a current state of the object, wherein the current state is used to determine which operations are permissible to be performed on the object.

18. The apparatus of claim 15, wherein each entry in the metadata hash table contains a counter that indicates a number of times an operation associated with the object has been requested.

19. The apparatus of claim 15, wherein each entry of the metadata hash table is associated with a respective lock and wherein the control circuitry is further configured to:

in response to determining that the object is already locked by the lock associated with the first entry, delay performance of the requested operation on the object until the first entry is no longer locked; and perform an operation on another uniquely identified object associated with a second entry in the metadata hash table, wherein the operation is performed while the first entry is locked and the second entry is not locked.

20. The apparatus of claim 15, wherein:

the second storage component stores a second reverse lookup hash table, wherein each entry of the second reverse lookup hash table indicates that the location of the requested object in the second storage component is associated with the respective entry of the metadata hash table.

* * * * *